United States Patent [19]

Inoue et al.

[11] Patent Number: 4,897,373

[45] Date of Patent: Jan. 30, 1990

[54] DIELECTRIC CERAMIC COMPOSITION

[75] Inventors: Yoshihito Inoue; Takashi Yamaguchi; Masashi Saito; Takeshi Inoue, all of Saitama, Japan

[73] Assignee: Mitsubishi Mining and Cement Co., Ltd., Tokyo, Japan

[21] Appl. No.: 249,743

[22] Filed: Sep. 27, 1988

[30] Foreign Application Priority Data

Oct. 12, 1987 [JP] Japan .................. 62-256691

[51] Int. Cl.$^4$ .......................................... C04B 35/46
[52] U.S. Cl. ........................................ 501/134; 501/136
[58] Field of Search ................................ 501/134, 136

[56] References Cited

U.S. PATENT DOCUMENTS 4,048,546  9/1977  Bouchard et al. ................. 501/136

FOREIGN PATENT DOCUMENTS

| 0218085 | 1/1985 | Fed. Rep. of Germany | 501/134 |
|---|---|---|---|
| 52-022119 | 6/1977 | Japan | 501/134 |
| 55-121959 | 9/1980 | Japan . | |
| 55-144612 | 11/1980 | Japan . | |
| 56-103802 | 8/1981 | Japan . | |
| 57-025606 | 2/1982 | Japan . | |
| 57-067211 | 4/1982 | Japan . | |
| 57-168405 | 10/1982 | Japan | 501/134 |
| 58-089707 | 5/1983 | Japan . | |
| 59-105207 | 6/1984 | Japan . | |
| 59-116174 | 7/1984 | Japan . | |

OTHER PUBLICATIONS

Chemical Abstracts, vol. 101, No. 24, 220989y.

Primary Examiner—Mark L. Bell
Assistant Examiner—Anthony J. Green
Attorney, Agent, or Firm—Kanesaka and Takeuchi

[57] ABSTRACT

There is provided a dielectric ceramic composition which is composed mainly of $PbTiO_3$, $Pb(Mg_{\frac{1}{3}}Nb_{\frac{2}{3}})O_3$, and $Pb(Fe_{\frac{2}{3}}W_{\frac{1}{3}})O_3$, with 0.5 to 10 mol % of Pb atoms partly replaced by Ba atoms and/or Sr atoms as represented by the formula (I) below.

$$(Pb_{1-u}M_u)[Ti_x(Mg_{\frac{1}{3}}Nb_{\frac{2}{3}})_y(Fe_{\frac{2}{3}}W_{\frac{1}{3}})_z]O_3 \quad (I)$$

where
M denotes Ba and/or Sr,
$0.005 \leq u \leq 0.10$,
$0.10 \leq x \leq 0.40$,
$0.05 \leq y \leq 0.85$,
$0.05 \leq z \leq 0.55$.

6 Claims, No Drawings

DIELECTRIC CERAMIC COMPOSITION

FIELD OF THE INVENTION AND RELATED ART STATEMENT

The present invention relates to a dielectric ceramic composition. More particularly, it is concerned with a dielectric ceramic composition suitable as a dielectric material for high-capacity capacitors or the like on account of its high dielectric constant, outstanding temperature characteristics of dielectric constant, and low firing temperature.

Heretofore, the high-dielectric ceramic composition has been dominated by the one composed mainly of barium titanate ($BaTiO_3$). The $BaTiO_3$-based composition generally contains a shifter to shift the Curie point to the vicinity of room temperature, a depressor to improve the capacitance-temperature characteristics, a sintering promoter, and an anti-reducing agent.

Examples of the shifter include $BaSnO_3$, $BaZrO_3$, $CaZrO_3$, $CaSnO_3$, $SrTiO_3$, $PbTiO_3$, $La_2O_3$, and $CeO_2$. Examples of the depressor include $CaTiO_3$, $MgTiO_3$, $Bi_2(SnO_3)_3$, $Bi_2(TiO_3)_3$, $NiSnO_3$, $MgZrO_3$, and $MgSnO_3$. Examples of the sintering promoter include $Al_2O_3$, $SiO_2$, $ZnO$, $CeO_2$, $B_2O_3$, $Nb_2O_5$, and $WO_3$. Examples of the anti-reducing agent include $MnO_2$, $Fe_2O_3$, and $CuO$.

Unfortunately, the $BaTiO_3$-based composition has to be fired at a high temperature (1300° to 1400° C.). This leads to a high firing cost. In addition, when the composition is applied to multilayer ceramic capacitors, the high firing temperature makes it necessary to use an expensive noble metal such as palladium and platinum as internal electrodes, which prevents the cost reduction of multilayer ceramic capacitors.

To overcome this disadvantages, there have been developed those materials shown in Table 1 which are capable of firing at 1100° C. or below and permit the use of comparatively less expensive metals such as silver as internal electrodes.

Table 1

| Laid-open No. | Composition | Firing temperature (°C.) | Dielectric constant $\epsilon_5$ | Dielectric loss tan δ (%) | Resistivity ρ (Ω · cm) |
| --- | --- | --- | --- | --- | --- |
| 56-103802 | $Pb[Ti(Mg_\frac{1}{3}Nb_\frac{2}{3})(Fe_\frac{2}{3}W_\frac{1}{3})]O_3$ + $MnO_2$ or $Co_2O_3$ | 950 | 16000 | 3.0 | — |
| 55-121959 | $(Pb,M)[Ti(Mg_\frac{1}{3}Nb_\frac{2}{3})]O_3$ M = Ba, Sr, Ca | — | 24700 | 0.7 | — |
| 57-25606 | $Pb[Ti(Mg_\frac{1}{3}Nb_{170})]O_3$ | 1100 | 23000 | 1.25 | — |
| 58-89707 | $Pb[Ti(Fe_{170} W_\frac{1}{3})(Mn_\frac{1}{3}Nb_{170})]O_3$ | — | 11000 | 0.57 | $8 \times 10^{11}$ |
| 55-144612 | $Pb[Ti(Mg_\frac{1}{3}Nb_\frac{2}{3})(Mg_\frac{1}{3}W_\frac{1}{3})(Mn_\frac{1}{3}Nb_\frac{2}{3})]O_3$ | ⅔1000 | 9830 | 0.3 | $2 \times 10^{11}$ |
| 57-67211 | $Pb[Ti(Zn_\frac{1}{3}Nb_\frac{2}{3})(Fe_\frac{2}{3}W_\frac{1}{3})]O_3$ | 920 | 16200 | 0.66 | $5 \times 10^{11}$ |
| 59-105207 | $Pb[(Ni_\frac{1}{3}Nb_\frac{2}{3})(Zn_\frac{1}{3}Nb_\frac{2}{3})(Fe_\frac{2}{3}W_\frac{1}{3})]O_3$ | 880 | 4100 | 0.44 | $4.6 \times 10^{12}$ |

The high-performance dielectric ceramic compositions proposed so far are not necessarily satisfactory in all of dielectric constant, dielectric loss and resistivity as shown in Table 1. In addition, they are poor in the temperature characteristics of dielectric constant. For this reason, there has been a demand for a dielectric ceramic composition which is capable of firing at a low temperature and yet satisfactory in all of dielectric constant, dielectric loss, resistivity, and temperature chariacteristics of dielectric constant.

OBJECT AND SUMMARY OF THE INVENTION

It is an object of the present invention to provide a dielectric ceramic composition which has a high dielectric constant, a low dielectric loss, and a high resistivity.

It is another object of the present invention to provide a dielectric ceramic composition which can be made at a low cost into small-sized large-capacity capacitors of high reliability.

It is further another object of the present invention to provide a dielectric ceramic composition which is capable of firing at a low temperature and hence permits the use of inexpensive silver as the internal electrodes of multilayer ceramic capacitors, contributing to the reduction of the production cost of multilayer ceramic capacitors.

The dielectric ceramic composition of the present invention is composed mainly of $PbTiO_3$, $Pb(Mg_\frac{1}{3}Nb_\frac{2}{3})O_3$, and $Pb(Fe_\frac{2}{3}W_\frac{1}{3})O_3$, with Pb atoms partly replaced by Ba atoms and/or Sr atoms. Thus the dielectric composition is represented by the formula (I) below.

$$(Pb_{1-u}M_u)[Ti_x(Mg_\frac{1}{3}Nb_\frac{2}{3})_y(Fe_\frac{2}{3}W_\frac{1}{3})_z]O_3 \quad (I)$$

where
M denotes Ba and/or Sr,
$0.005 \leq u \leq 0.10$,
$0.10 \leq x \leq 0.40$,
$0.05 \leq y \leq 0.85$,
$0.05 \leq z \leq 0.55$,
preferably
$0.02 \leq u \leq 0.08$,
$0.15 \leq x \leq 0.35$,
$0.20 \leq y \leq 0.75$,
$0.10 \leq z \leq 0.36$.

In addition, the dielectric composition of the present invention may contain $Pb(Mn_\frac{1}{3}Nb_\frac{2}{3})O_3$ in an amount of 5 mol %, preferably 0.02 to 3 mol %, of the major components.

DETAILED DESCRIPTION OF PREFERRED EMBODIMENTS

The composition of the present invention is represented by the formula below
ti $Pb[Ti_x(Mg_\frac{1}{3}Nb_\frac{2}{3})_y(Fe_\frac{2}{3}W_\frac{1}{3})_z]O_3$ (where x, y, and z are defined as above) in which Pb atoms are partly replaced by Ba atoms or Sr atoms as shown in the formula (I) above. Therefore, the composition has an extremely low dielectric loss and a high resistivity.

With the value of u lower than 0.005 in the formula (I), the composition does not exhibit the desired properties. With the value of u higher than 0.10, the composition has a low dielectric constant. Consequently, the value of u should be in the range of from 0.005 to 0.10, preferably from 0.02 to 0.08.

With the value of x lower than 0.10 in the formula (I), the composition has a low dielectric constant. With the value of x higher than 0.40, the composition has a low resistivity and a high dielectric loss. Consequently, the value of x should be in the range of from 0.10 to 0.40, preferably from 0.15 to 0.35.

With the value of y lower than 0.05 in the formula (I), the composition has a low resistivity. With the value of y higher than 0.85, the composition has a low dielectric constant. Consequently, the value of y should be in the range of from 0.05 to 0.85, preferably from 0.20 to 0.75.

With the value of z lower than 0.05 in the formula (I), the composition has a high firing temperature and a low dielectric constant. With the value of z higher than 0.55, the composition has a low resistivity. Consequently, the value of z should be in the range of from 0.05 to 0.55, preferably from 0.10 to 0.36.

The dielectric composition of the present invention may be incorporated with $Pb(Mn_{\frac{1}{3}}Nb_{\frac{2}{3}})O_3$ to increase the dielectric constant and resistivity and decrease the dielectric loss. To produce this effect, the amount to be added should be less than 5 mol %, preferably 0.02 to 3 mol %, of the major components.

The dielectric composition of the present invention is produced in the following manner. At first, raw material powders such as lead monoxide, titanium dioxide, barium titanate, strontium carbonate, magnesium oxide, niobium pentoxide, ferric oxide, tungsten trioxide, and manganese dioxide are weighed according to a prescribed ratio. They are thoroughly mixed by wet process using a ball mill or the like. The resulting mixture is dried and, if necessary, calcined at 600° to 800° C. for several hours. This calcination is not a must; but it makes the particle size uniform and improves the dielectric properties. The calcined raw material powder is pulverized further by wet process using a ball mill or the like. After drying, the powder is granulated with an organic binder such as polyvinyl alcohol. The granules are press-formed into a desired shape. The shaped item is fired at 950° to 1050° C. for half an hour to several hours. (The above-mentioned numerical values are merely exemplary; and the composition may be produced under other conditions.)

The dielectric composition of the present invention has a high dielectric constant, a low dielectric loss, and a high resistivity. Therefore, it can be made into small-sized, high-capacity capacitors of high reliability.

In addition, the dielectric composition of the present invention can be fired at low temperatures (950° to 1050° C.). This leads to a low firing cost and permits the use of comparatively less expensive metals (e.g., silver) in place of expensive noble metals (e.g., palladium and platinum) for the internal electrodes when it is made into laminated capacitors. This, in turn, contributes to a great reduction in the production cost of multilayer ceramic capacitors.

The invention is now described in more detail with reference to the following examples, which are not intended to restrict the scope of the invention.

EXAMPLE 1

Dielectric ceramic compositions were prepared from PbO, $BaTiO_3$, $SrCO_3$, $TiO_2$, MgO, $Nb_2O_5$, $Fe_2O_3$, $WO_3$, and $MnO_2$. They were weighed according to the mixing ratio shown in Table 2 and then mixed by wet process for 20 hours using a ball mill. The resulting mixture was dehydrated, dried, and calcined at 750° C. for 2 hours. The calcined product was pulverized again by wet process for 20 hours using a ball mill, followed by dehydration and drying.

The thus obtained powder was mixed with an aqueous solution of polyvinyl alcohol, and the wet powder was compression-molded into disks, 16 mm in diameter and 0.8 mm thick, under a pressure of 3 tons/cm². The molded disks were fired at 950° to 1050° C. for 2 hours in a magnesia ceramic vessel.

Each of the fired disks was provided on both sides thereof with silver electrode by firing at 650° to 700° C. The disks were examined for electrical properties. The results are shown in Table 2.

The dielectric constant and dielectric loss were measured with a YHP digital LCR meter, Model 4274A, at a frequency of 1 kHz and a voltage of 1.0 $V_{rms}$ and at a temperature of 25° C. The resistivity was measured with a YHP meter, Model 4329A, at 25° C. Readings were taken one minute after the application of 100 V. In Table 2, $\epsilon_{-25}$, $\epsilon_{25}$, and $\epsilon_{85}$ denote the dielectric constant at $-25°$ C., 25° C., and 85° C., respectively, and $\epsilon_{max}$ denotes the maximum value of dielectric constant in the temperature range of $-25°$ C. to 85° C.

It is noted from Table 2 that the dielectric ceramic compositions of the present invention have a high dielectric constant, a low dielectric loss, a high resistivity, and outstanding temperature characteristics of dielectric constant.

TABLE (2)1

| Sample No. | x | y | z | M | u | Pb(Mn₁Nb₂)O₃ (mol %) | Firing temp. (°C.) | Dielectric constant | Dielectric loss (%) | Resistivity (Ω.cm) | $(E_{25}-E_{-25})/E_{25} \times 100$ | $(E_{max}-E_{25})/E_{25} \times 100$ | $(E_{85}-E_{25})/E_{25} \times 100$ | Note |
|---|---|---|---|---|---|---|---|---|---|---|---|---|---|---|
| 1 | 0.05 | 0.75 | 0.20 | Ba | 0.02 | | 1000 | 7200 | 0.76 | $4.6 \times 10^{12}$ | 49.0 | 49.0 | −37.4 | C.E. |
| 2 | 0.05 | 0.85 | 0.10 | Ba | 0.05 | | 1050 | 7700 | 0.10 | $7.3 \times 10^{12}$ | 42.4 | 42.4 | −43.9 | C.E. |
| 3 | 0.09 | 0.61 | 0.30 | Ba | 0.10 | | 1000 | 8500 | 0.10 | $6.5 \times 10^{12}$ | 52.2 | 52.2 | −45.7 | C.E. |
| 4 | 0.12 | 0.78 | 0.10 | Ba | 0.05 | | 1050 | 9800 | 0.25 | $8.5 \times 10^{12}$ | −5.7 | 6.7 | −28.8 | C.E. |
| 5 | 0.15 | 0.55 | 0.30 | Sr | 0.003 | 1.0 | 1000 | 14400 | 2.14 | $8.3 \times 10^{10}$ | −61.0 | 1.7 | −57.6 | W.E. |
| 6 | 0.15 | 0.65 | 0.20 | Ba | 0.02 | | 1000 | 12100 | 0.91 | $3.4 \times 10^{12}$ | −41.4 | 2.1 | −37.9 | W.E. |
| 7 | 0.15 | 0.75 | 0.10 | Ba | 0.02 | 0.5 | 1000 | 13000 | 0.74 | $6.1 \times 10^{12}$ | −40.1 | 1.5 | −38.3 | W.E. |
| 8 | 0.15 | 0.52 | 0.30 | Ba | 0.08 | | 1050 | 9600 | 0.97 | $8.0 \times 10^{11}$ | −36.1 | 2.3 | −30.8 | W.E. |
| 9 | 0.18 | 0.45 | 0.35 | Ba | 0.05 | | 1000 | 12400 | 0.27 | $8.5 \times 10^{11}$ | 6.8 | 18.8 | −45.6 | C.E. |
| 10 | 0.20 | 0.70 | 0.10 | Ba | 0.002 | 1.0 | 1000 | 12900 | 2.51 | $2.0 \times 10^{11}$ | −52.9 | 3.1 | −41.7 | W.E. |
| 11 | 0.20 | 0.78 | 0.02 | Ba | 0.05 | | 1050 | 9000 | 0.47 | $5.3 \times 10^{12}$ | −40.1 | 12.8 | −19.7 | C.E. |
| 12 | 0.20 | 0.42 | 0.35 | Ba | 0.05 | | 1100 | 7500 | 0.61 | $6.5 \times 10^{12}$ | −46.6 | 15.0 | −2.3 | W.E. |
| 13 | 0.23 | 0.42 | 0.35 | Ba | 0.02 | | 1000 | 14200 | 0.92 | $3.4 \times 10^{11}$ | −44.2 | 2.3 | −32.6 | W.E. |
| 14 | 0.23 | 0.46 | 0.30 | Sr | 0.03 | 1.0 | 1000 | 15600 | 0.86 | $2.0 \times 10^{12}$ | −46.1 | 1.7 | −30.9 | W.E. |
| 15 | 0.24 | 0.46 | 0.30 | Ba | 0.03 | 1.0 | 1000 | 16000 | 0.45 | $1.3 \times 10^{12}$ | −36.5 | 1.2 | −34.7 | W.E. |
| 16 | 0.24 | 0.46 | 0.30 | Ba | 0.05 | 0.5 | 1000 | 14900 | 0.26 | $2.1 \times 10^{11}$ | −19.6 | 5.1 | −33.8 | C.E. |
| 17 | 0.24 | 0.35 | 0.40 | Ba | 0.05 | 7.0 | 1000 | 12900 | 2.52 | $7.8 \times 10^{11}$ | −56.2 | 7.2 | −26.9 | W.E. |
| 18 | 0.25 | 0.35 | 0.40 | Ba | 0.02 | 2.0 | 1000 | 13200 | 0.79 | $1.2 \times 10^{12}$ | −54.5 | 5.9 | −24.4 | W.E. |
| 19 | 0.25 | 0.50 | 0.25 | | | | 950 | 5300 | 3.61 | $2.1 \times 10^{10}$ | −29.7 | 50.1 | 50.1 | C.E. |
| 20 | 0.25 | 0.55 | 0.20 | Ba | 0.15 | | 1000 | 7200 | 0.36 | $2.1 \times 10^{12}$ | −23.6 | 2.7 | −19.1 | C.E. |
| 21 | 0.25 | 0.75 | | Ba | 0.05 | | 1150 | 7100 | 2.10 | $7.2 \times 10^{12}$ | −42.1 | 32.5 | 29.8 | C.E. |
| 22 | 0.26 | 0.39 | 0.35 | Ba | 0.02 | 1.0 | 1000 | 13200 | 0.88 | $3.8 \times 10^{11}$ | −47.0 | 18.6 | −10.4 | W.E. |
| 23 | 0.26 | 0.39 | 0.35 | Ba | 0.08 | 1.0 | 1000 | 11800 | 0.29 | $6.0 \times 10^{11}$ | 18.8 | 19.8 | −44.4 | W.E. |
| 24 | 0.30 | 0.30 | 0.40 | Ba | 0.05 | 1.0 | 950 | 13600 | 0.33 | $1.5 \times 10^{12}$ | −53.7 | 0.2 | −39.9 | W.E. |
| 25 | 0.30 | 0.35 | 0.35 | Ba | 0.05 | 1.0 | 1000 | 14000 | 0.35 | $1.0 \times 10^{12}$ | −54.5 | 6.1 | −22.3 | W.E. |
| 26 | 0.30 | 0.10 | 0.60 | Ba | 0.05 | | 950 | 8200 | 0.92 | $1.2 \times 10^{10}$ | 8.1 | 26.3 | −52.0 | C.E. |
| 27 | 0.30 | 0.50 | 0.20 | Ba | 0.05 | | 1000 | 10400 | 0.62 | $3.6 \times 10^{12}$ | −47.9 | 12.0 | −5.3 | W.E. |
| 28 | 0.32 | 0.23 | 0.45 | Ba | 0.05 | 1.0 | 950 | 12500 | 0.56 | $7.8 \times 10^{11}$ | −44.9 | 4.1 | −20.6 | W.E. |
| 29 | 0.32 | 0.28 | 0.40 | Sr | 0.05 | 3.0 | 950 | 10600 | 0.61 | $4.3 \times 10^{11}$ | −47.6 | 5.5 | −42.9 | W.E. |
| 30 | 0.32 | 0.28 | 0.40 | Ba | 0.05 | | 950 | 12100 | 0.47 | $1.1 \times 10^{11}$ | −45.3 | 4.7 | −43.0 | W.E. |
| 31 | 0.32 | 0.33 | 0.35 | Sr | 0.05 | 3.0 | 1000 | 13300 | 0.52 | $8.0 \times 10^{11}$ | −43.8 | 6.5 | −15.0 | W.E. |
| 32 | 0.35 | 0.53 | 0.12 | Ba | 0.08 | 1.0 | 1050 | 9200 | 0.73 | $2.1 \times 10^{12}$ | −52.8 | 0.6 | −26.0 | W.E. |
| 33 | 0.45 | 0.10 | 0.45 | Sr | 0.05 | 3.0 | 950 | 8800 | 1.56 | $6.0 \times 10^{10}$ | −38.2 | 41.7 | 41.7 | C.E. |
| 34 | 0.45 | 0.03 | 0.52 | Ba | 0.05 | 3.0 | 950 | 8100 | 1.34 | $4.3 \times 10^{10}$ | −45.1 | 33.6 | 28.4 | C.E. |
| 35 | 0.45 | 0.40 | 0.15 | Sr | 0.12 | | 1050 | 6400 | 1.52 | $4.3 \times 10^{11}$ | −32.2 | 7.0 | −15.7 | C.E. |

Remarks:
Columns 2 to 6 show the numerical values in the formula (I).
Columns 12 to 14 show the temperature characteristics of dielectric constant (%).
W.E. = Working Examples, C.E. = Comparitive Examples

What is claimed is:

1. A dielectric ceramic composition comprising $PbTiO_3$, $Pb(Mg_{\frac{1}{3}}Nb_{\frac{2}{3}})O_3$, and $Pb(Fe_{\frac{2}{3}}W_{\frac{1}{3}})O_3$, with 0.5 to 10 mol % of Pb atoms partly replaced by at least one of Ba atoms and Sr atoms as represented by the formula (I) below:

$$(Pb_{1-u}M_u)[Ti_x(Mg_{\frac{1}{3}}Nb_{\frac{2}{3}})_y(Fe_{\frac{2}{3}}W_{\frac{1}{3}})_z]O_3 \quad (I)$$

where
M denotes at least one of Ba and Sr,
$0.005 \leq u \leq 0.10$,
$0.10 \leq x \leq 0.40$,
$0.05 \leq y \leq 0.85$,
$0.05 \leq z \leq 0.55$, and
$Pb(Mn_{\frac{1}{3}}Nb_{\frac{2}{3}})O_3$ in an amount more than 0 an mol % of said above components.

2. A dielectric ceramic composition as claimed in claim 1, wherein the value of u in the formula (I) is in the range of $0.02 \leq u \leq 0.08$.

3. A dielectric ceramic composition as claimed in claim 1, wherein the value of x in the formula (I) is in the range of $0.15 \leq x \leq 0.35$.

4. A dielectric ceramic composition as claimed in claim 1, wherein the value of y in the formula (I) is in the range of $0.20 \leq y \leq 0.75$.

5. A dielectric ceramic composition as claimed in claim 1, wherein the value of z in the formula (I) is in the range of $0.10 \leq z \leq 0.36$.

6. A dielectric ceramic composition as claimed in claim 1 wherein $Pb(Mn_{\frac{1}{3}}Nb_{\frac{2}{3}})O_3$ is contained in an amount of 0.02 to 3 mol %.

* * * * *